(12) United States Patent
Kumar et al.

(10) Patent No.: US 12,504,024 B1
(45) Date of Patent: Dec. 23, 2025

(54) DIFFUSERS, GAS TURBINE ENGINES COMPRISING THE SAME, AND METHODS FOR OPERATION THEREOF

(71) Applicant: HONEYWELL INTERNATIONAL INC., Charlotte, NC (US)

(72) Inventors: Shailesh Kumar, Bangalore (IN); Nick Nolcheff, Phoenix, AZ (US); Tirumala Rao Koka, Phoenix, AZ (US); Shraman Goswami, Bangalore (IN); Shakeel Nasir, Phoenix, AZ (US)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 0 days.

(21) Appl. No.: 19/209,005

(22) Filed: May 15, 2025

(51) Int. Cl.
| | | |
|---|---|---|
| *F04D 29/44* | (2006.01) | |
| *F01D 5/04* | (2006.01) | |
| *F01D 5/14* | (2006.01) | |
| *F01D 9/04* | (2006.01) | |
| *F02C 3/08* | (2006.01) | |

(52) U.S. Cl.
CPC ........... *F04D 29/444* (2013.01); *F01D 5/048* (2013.01); *F01D 5/14* (2013.01); *F01D 9/041* (2013.01); *F01D 9/045* (2013.01); *F02C 3/08* (2013.01); *F04D 29/441* (2013.01)

(58) Field of Classification Search
CPC . F01D 9/041; F01D 9/045; F01D 5/14; F01D 5/048; F04D 29/441; F04D 29/444; F02C 3/08
See application file for complete search history.

(56) References Cited

U.S. PATENT DOCUMENTS

| | | | |
|---|---|---|---|
| 7,955,051 B2 | 6/2011 | Daguenet et al. | |
| 8,540,484 B2 | 9/2013 | Hollman et al. | |
| 8,616,843 B2 | 12/2013 | Shibata et al. | |
| 8,926,276 B2 * | 1/2015 | Japikse | F04D 1/00 |
| | | | 415/208.3 |
| 11,085,460 B2 | 8/2021 | Japikse | |
| 11,131,210 B2 * | 9/2021 | Goswami | F01D 17/18 |
| 11,333,171 B2 * | 5/2022 | Nasir | F02C 3/08 |
| 2005/0163610 A1 * | 7/2005 | Higashimori | F04D 29/444 |
| | | | 415/191 |
| 2022/0074423 A1 | 3/2022 | Duong | |

FOREIGN PATENT DOCUMENTS

JP 2015108342 A 6/2015

* cited by examiner

*Primary Examiner* — Kyle Robert Thomas
(74) *Attorney, Agent, or Firm* — Ingrassia, Fisher & Lorenz LLP

(57) ABSTRACT

Diffusers are provided for gas turbine engines downstream of an impeller of a centrifugal compressor. The diffusers include a diffuser flowbody having an inner and outer peripheral portions, diffuser passages extending through the diffuser flowbody that include passage inlets and outlets formed in the inner and outer peripheral portions, respectively, and diffuser vanes contained in the diffuser flowbody and partitioning the diffuser passages. Each of the diffuser vanes include a first vane sidewall, a second vane sidewall opposite the first vane sidewall, a hub-side endwall, and a shroud-side endwall opposite the hub-side endwall. Each of the diffuser vanes have a thickness between the first sidewall and the second sidewall and a tapered cross-sectional profile portion that decreases from the shroud-side endwall to the hub-side endwall.

20 Claims, 9 Drawing Sheets

DIFFUSERS, GAS TURBINE ENGINES COMPRISING THE SAME, AND METHODS FOR OPERATION THEREOF

TECHNICAL FIELD

The present invention generally relates to gas turbine engines, and more particularly relates to diffuser systems having a vaned diffuser.

BACKGROUND

Diffusers are employed in compression systems to reduce the velocity of compressed airflow, while increasing static pressure prior to delivery of the airflow into, for example, a combustion section of a gas turbine engine. Diffusers typically include a plurality of airfoils or two-dimensional (2D) vanes (e.g., vanes with a constant shape from hub to shroud), which are arranged in an annular array between two annular plates or endwalls. Collectively, the 2D vanes and the endwalls form an annular flowbody, which includes inlets distributed along its inner periphery and outlets distributed along outer periphery. Diffuser passages connect the diffuser inlets to the diffuser outlets, with adjacent passages partitioned or separated by the 2D vanes. The 2D vanes are dimensioned and shaped such that the diffuser passages increase in cross-sectional flow area, moving from the inlets toward the outlets, to provide the desired diffusion functionality as compressed airflow is directed through the diffuser.

Diffusers are commonly utilized within gas turbine engines and other turbomachines containing impellers or other compressor rotors. A diffuser may be positioned around an impeller to receive the compressed airflow discharged therefrom. The airflow decelerates and static pressure increases as the airflow passes through the diffuser. The airflow may further be conditioned by other components, such as a deswirl section, contained in the gas turbine engine and located downstream of the diffuser. The airflow is then delivered into the combustion section of the gas turbine engine, injected with a fuel, and ignited to generate combustive gases. Thus, the efficiency which with a diffuser converts the velocity of the compressed airflow into static pressure, while avoiding or minimizing energy content losses due to excessive drag, boundary layer separation, wake generation and mixing, and other such effects, impacts the overall efficiency of the gas turbine engine compressor section. While conventional diffusers perform adequately, generally considered, still further diffuser performance improvements are sought. A continued demand consequently exists, within the aerospace industry and other technology sectors, to provide diffusers having improved aerodynamic performance characteristics, ideally with relatively little, if any tradeoffs in added weight, bulk, or manufacturing costs of the diffuser.

BRIEF SUMMARY

This summary is provided to describe select concepts in a simplified form that are further described in the Detailed Description. This summary is not intended to identify key or essential features of the claimed subject matter, nor is it intended to be used as an aid in determining the scope of the claimed subject matter.

In various examples, a diffuser is provided that is configured to be disposed in an engine between an impeller of a centrifugal compressor and a combustor. The diffuser includes a diffuser flowbody having an inner peripheral portion and an outer peripheral portion, diffuser passages extending through the diffuser flowbody, the diffuser passages comprising passage inlets formed in the inner peripheral portion of the diffuser flowbody and passage outlets formed in the outer peripheral portion of the diffuser flowbody, and diffuser vanes contained in the diffuser flowbody and partitioning the diffuser passages, each of the diffuser vanes comprising a first vane sidewall, a second vane sidewall opposite the first vane sidewall, a hub-side endwall, and a shroud-side endwall opposite the hub-side endwall, wherein each of the diffuser vanes having a thickness between the first sidewall and the second sidewall and a tapered cross-sectional profile portion, wherein the thickness of each of the diffuser vanes within the tapered cross-sectional profile portion decreases from the shroud-side endwall to the hub-side endwall.

In various examples, a gas turbine engine is provided that includes a compressor section including: an impeller configured to pressurize an intake fluid to produce a compressed fluid and a diffuser configured to receive the compressed fluid in passages thereof, wherein the passages are partitioned by diffuser vanes each including a first vane sidewall, a second vane sidewall opposite the first vane sidewall, a hub-side endwall, and a shroud-side endwall opposite the hub-side endwall, wherein each of the diffuser vanes have a thickness between the first sidewall and the second sidewall and a tapered cross-sectional profile portion, wherein the thickness of each of the diffuser vanes within the tapered cross-sectional profile portion decreases from the shroud-side endwall to the hub-side endwall, a combustion section configured to form a mixture of the compressed fluid with a fuel and combust the mixture to form an exhaust, and a turbine section configured to rotate in response to receiving the exhaust.

In various examples, a method of operating an engine is provided that includes receiving a compressed fluid from an impeller into passages of a diffuser, modifying a flow of the compressed fluid with diffuser vanes partitioning the passages, wherein the diffuser vanes each include a first vane sidewall, a second vane sidewall opposite the first vane sidewall, a hub-side endwall, and a shroud-side endwall opposite the hub-side endwall, wherein each of the diffuser vanes having a thickness between the first sidewall and the second sidewall and a tapered cross-sectional profile portion, wherein the thickness of each of the diffuser vanes within the tapered cross-sectional profile portion decreases from the shroud-side endwall to the hub-side endwall, and directing the compressed fluid from the diffuser to a combustor.

Furthermore, other desirable features and characteristics of the diffuser, the gas turbine engine, and the method will become apparent from the subsequent detailed description and the appended claims, taken in conjunction with the accompanying drawings and the preceding background.

BRIEF DESCRIPTION OF DRAWINGS

The present disclosure will hereinafter be described in conjunction with the following drawing figures, wherein like numerals denote like elements, and wherein.

DETAILED DESCRIPTION

The following detailed description is merely exemplary in nature and is not intended to limit the invention or the application and uses of the invention. As used herein, the word "exemplary" means "serving as an example, instance, or illustration." Thus, any embodiment described herein as "exemplary" is not necessarily to be construed as preferred or advantageous over other embodiments. All of the embodiments described herein are exemplary embodiments provided to enable persons skilled in the art to make or use the invention and not to limit the scope of the invention which is defined by the claims. Furthermore, there is no intention to be bound by any expressed or implied theory presented in the preceding technical field, background, brief summary, or the following detailed description.

Broadly, exemplary embodiments discussed herein include diffusers for engines, such as gas turbine engines, that are configured for installation within a compressor section of the engine. The diffusers include diffuser vanes having a tapered cross-sectional profile portion that is configured to promote low diffusion loss in the compressor section.

Figure 1:
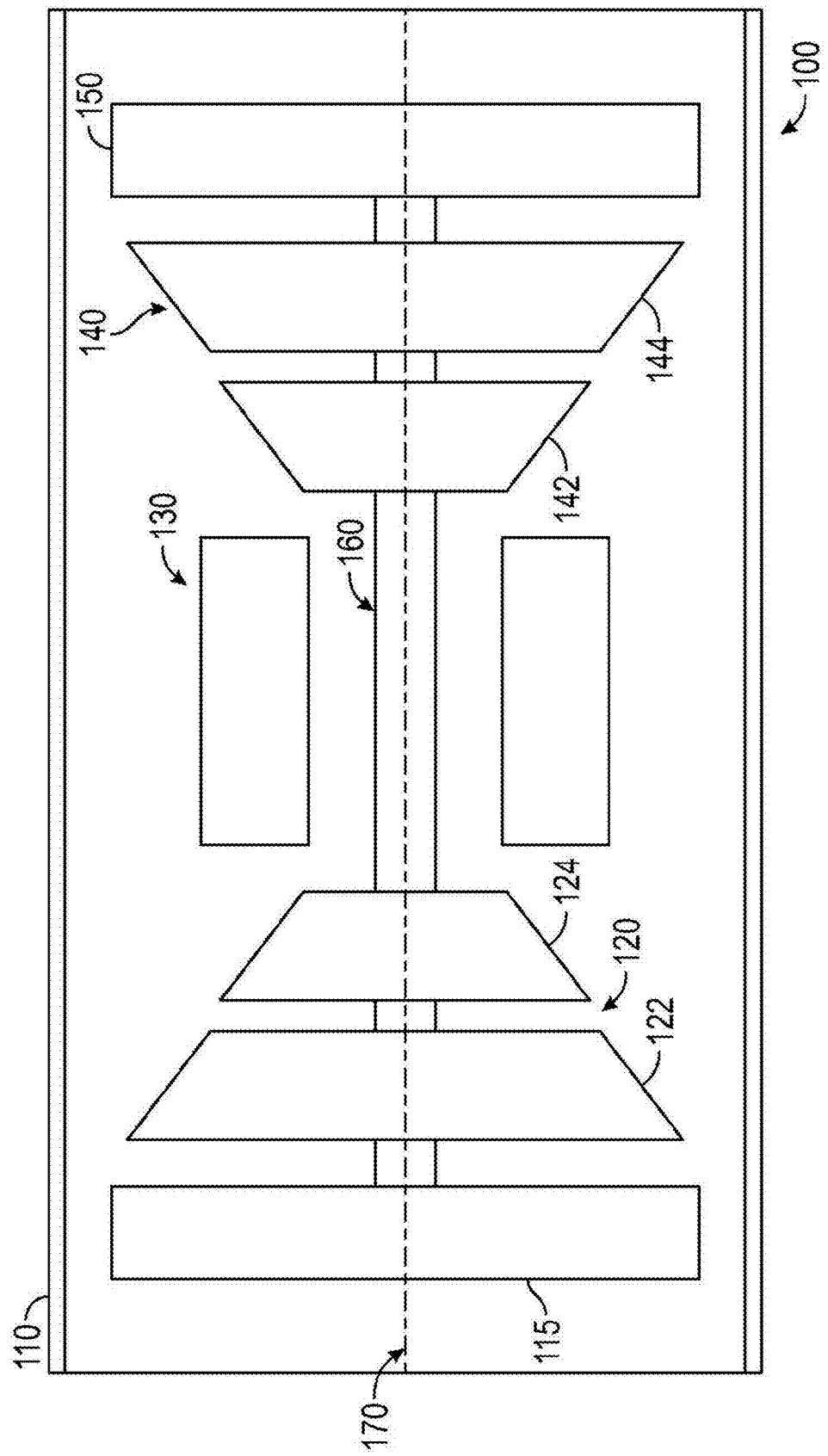
FIG. 1 is a simplified cross-sectional side view of a gas turbine engine according to aspects of an exemplary embodiment.

Reference now is made to the drawings in which FIG. 1 shows a simplified, cross-sectional view of a gas turbine engine 100 according to an embodiment. The engine 100 may be disposed in an engine housing 110 and may include an intake section 115, a compressor section 120, a combustion section 130, a turbine section 140, and an exhaust section 150. The compressor section 120, turbine section 140 and exhaust section 150 are operably coupled to a shaft assembly 160 for rotation within the housing 110. A fluid is drawn into the engine housing 110 through the intake section 115 and into the compressor section 120. The compressor section 120 includes an axial compressor 122 which may include one or more axial stages and a centrifugal compressor 124 that increases the pressure of the fluid entering the engine 100. Compression of the fluid may also result in heating of the fluid through the compressor section 120. The compressor section 120 is in fluid communication with the combustion section 130 and directs the compressed fluid into a combustion chamber where the compressed fluid is mixed with fuel and combusted in the combustion chamber. Hot exhaust fluids are then directed into the turbine section 140. The hot exhaust fluids expand through and rotate the turbine section 140 prior to being exhausted through the exhaust section 150 of the engine 100.

The turbine section 140 rotates to drive equipment in the engine 100 via rotors or spools concentrically disposed about an axis of rotation 170 within the shaft assembly 160. Specifically, the turbine section 140 may include one or more rotors 142, 144 driven by the expanding exhaust fluids to rotate to the shaft assembly 160 and drive the compressor section 120 including the axial compressor 122 and the centrifugal compressor 124. While FIG. 1 depicts an exemplary configuration having an axi-centrifugal compressor core in a turboshaft engine, other embodiments may have alternate configurations. Thus, the exemplary embodiments discussed herein are not intended to be limited to a turboshaft engine, but rather may be readily adapted for use in other types of turbine engines including but not limited to turbofan and turboprop engines.

Figure 2:
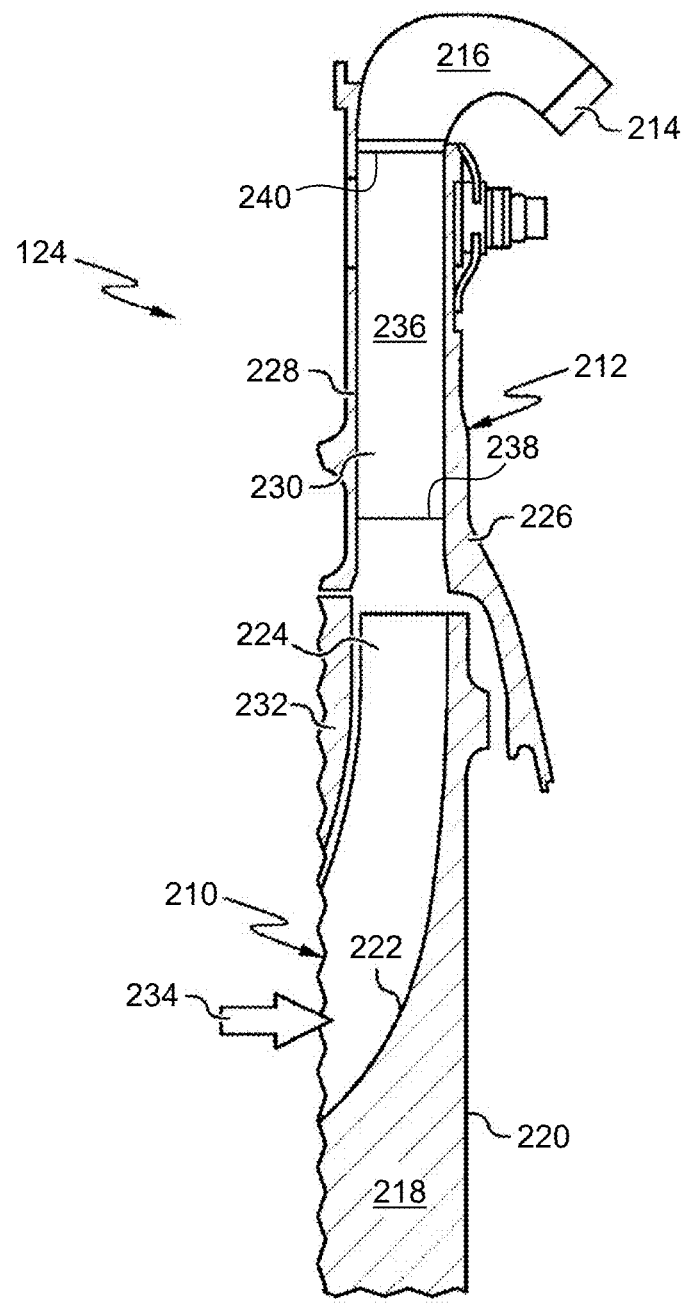
FIG. 2 is a cross-sectional view of an exemplary compressor section (partially shown) of a gas turbine engine including a diffuser according to aspects of an exemplary embodiment.

As represented in FIG. 2, the centrifugal compressor 124 includes an impeller 210, only the trailing portion of which is shown, a diffuser 212, a conduit or bend 216, and a deswirl section 214. During operation, the impeller 210 spins rapidly about the axis of rotation 170. The axis of rotation 170 is also representative of the centerline of the diffuser 212 and the engine 100 generally and is consequently referred to hereafter as "the centerline 170." The impeller 210 and the diffuser 212 may be generally axisymmetric about the centerline 170, as will many of the components contained within engine 100. Thus, when viewed in three dimensions, the impeller 210 may possess a generally conical shape, while the diffuser 212 may have a substantially annular or ring-like geometry. The impeller 210 includes a central body 218 from which a number of impeller vanes or blades 224 project (only one of which is shown in FIG. 2). The impeller blades 224 wrap or twist about the centerline 170 in, for example, the direction of rotation of the impeller 210. The outer conical surface or "hub" of the impeller 210 is identified in FIG. 2 by reference numeral 222, while the backside or "disk" surface of the impeller 210 is identified by reference numeral 220. As further indicated by arrow 234, a number of passages extend over the hub 222 and are separated by the impeller blades 224. The impeller 210 and, more specifically, the hub flow paths are further enclosed by a shroud 232, which is partially shown and which is positioned around an outer periphery of the impeller 210.

Figure 3:
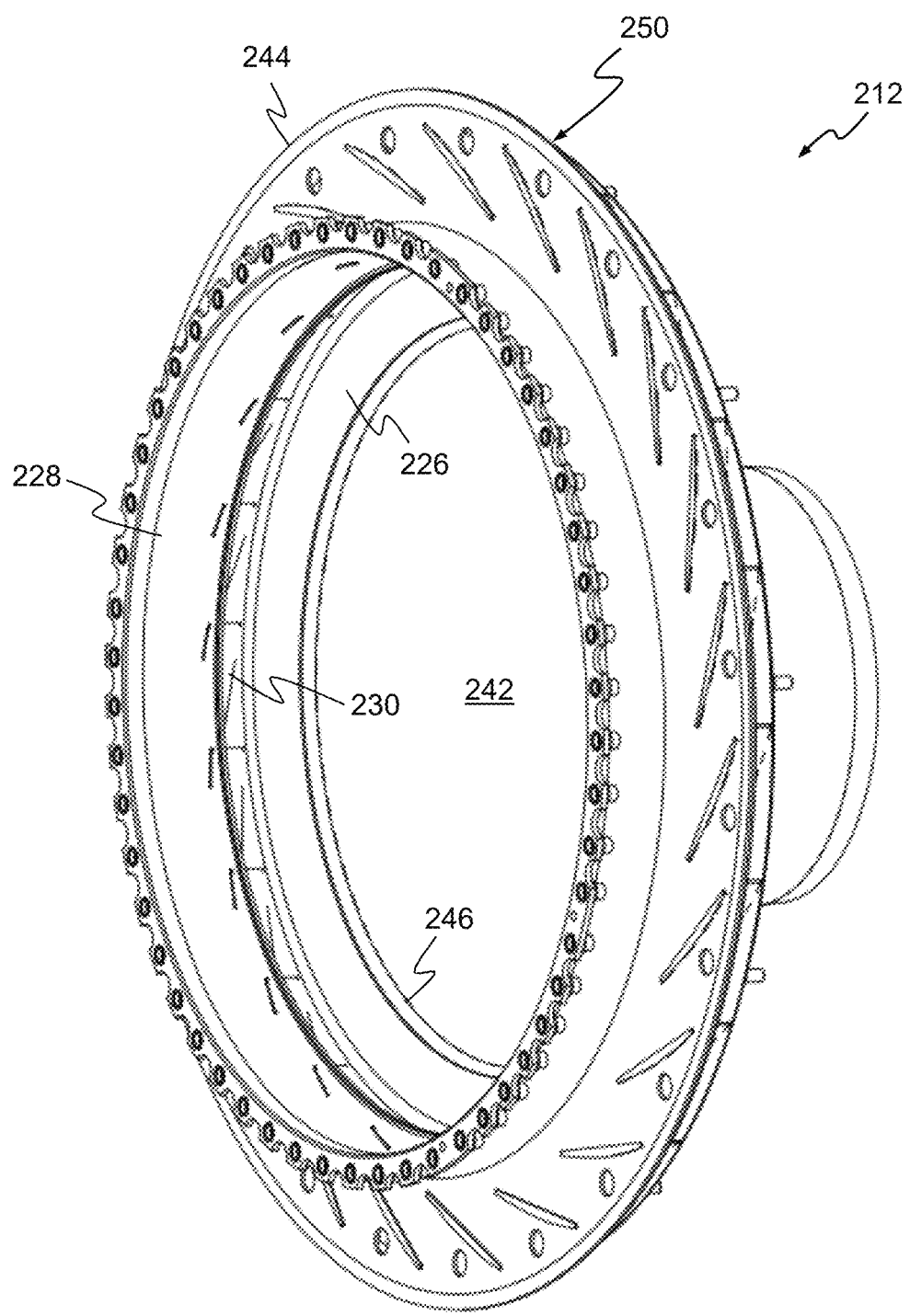
FIG. 3 is a perspective view of an exemplary diffuser according to aspects of an exemplary embodiment.

Referring to FIGS. 2 and 3, the diffuser 212 includes a plurality of airfoils or tapered diffuser vanes 230. The diffuser vanes 230 are arranged in an annular array or circumferentially-spaced grouping, which is disposed between two annular plates or endwalls 228, 226. The endwall 228 is referred to below as the "shroud-side" or "forward" endwall 228 in view of its forward position relative to the endwall 226 along the centerline 170. Conversely, the endwall 226 is referred to as the "hub-side" or "aft" endwall 226 below. The shroud-side endwall 228 and the hub-side endwall 226 are spaced along the centerline 170 by a predetermined distance, with the spacing between the endwalls 226, 228 equivalent to the span of the diffuser vanes 230. Collectively, the diffuser vanes 230 and the endwalls 226, 228 define an annular diffuser flowbody 250. In other embodiments, the diffuser 212 may lean in an axial direction such that the annular diffuser flowbody 250 has a more conical shape. A plurality of diffuser passages 236 extends through the annular diffuser flowbody 250 (again, only one of which is visible in FIG. 2). Specifically, the diffuser passages 236 extend through the annular diffuser flowbody 250 of the diffuser 212 in radially outward directions; that is, along axes substantially perpendicular to the centerline 170. The diffuser passages 236 fluidly connect diffuser inlets 238, which are distributed (e.g., angularly spaced at regular intervals) about an inner periphery of the diffuser 212; to diffuser outlets 240, which are similarly distributed (e.g., angularly spaced at regular intervals) about an outer periphery of the diffuser 212.

During operation, the impeller 210 discharges compressed airflow in radially-outward directions (away from the centerline 170) and into the diffuser inlets 238 of the diffuser 212. The airflow is conducted through the diffuser passages 236 and is discharged from the diffuser 212 through the diffuser outlets 240. The pressurized airflow discharged from the diffuser outlets 240 is next conducted through the bend 216, which turns the airflow back toward the centerline 170 of the engine 100. The compressed airflow may also pass through the deswirl section 214, which contains vanes, baffles, or the like, to reduce any tangential component of the airflow remaining from the action of the impeller 210. Afterwards, the pressurized airflow enters the combustion section 130 and is received within a combustion chamber of a combustor. A fuel spray is injected into the combustion chamber via a fuel injector, and the fuel-air mixture is ignited within the combustor. The resulting combustive gasses are then discharged from the combustor and directed into the turbine section 140 to generate the desired power output, whether mechanical, electrical, pneumatic, or hydraulic in nature, or a combination thereof.

In the perspective view of FIG. 3, the annular shape of the diffuser 212 is shown, noting a central opening 242 formed in the annular diffuser flowbody 250. In addition to the central opening 242, the annular diffuser flowbody 250 includes an outer peripheral portion 244 and an inner peripheral portion 246 around which the outer peripheral portion 244 extends. The inner peripheral portion 246 of the annular diffuser flowbody 250 circumscribes and defines the central opening 242, which accommodates or receives the impeller 210 when the diffuser 212 is installed within the engine 100. As previously indicated, the diffuser inlets 238 and the diffuser outlets 240 are angularly spaced about the inner peripheral portion 246 and the outer peripheral portion 244 of the annular diffuser flowbody 250, respectively. Due to the geometry of the diffuser vanes 230, the diffuser passages 236 may increase in cross-sectional flow area in directions from the diffuser inlets 238 to the diffuser outlets 240 to provide the desired diffusion functionality.

Figure 4:
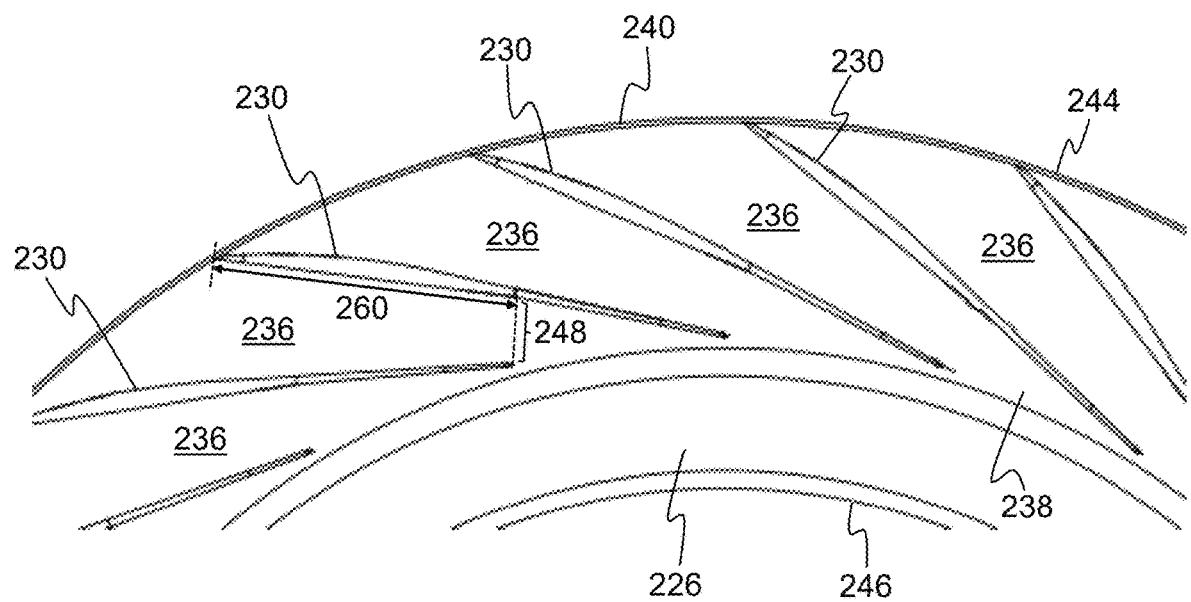
FIG. 4 is a partial, cross-sectional view of the diffuser of FIG. 3 according to aspects of an exemplary embodiment.

Referring now to FIG. 4, a portion of the diffuser 212 is shown isometrically with the shroud-side endwall 228 removed to reveal the internal features of the diffuser 212, such as the tapered diffuser vanes 230 and the diffuser passages 236. The diffuser vanes 230 are arranged or spatially distributed in an annular array, which is angularly spaced about the centerline 170 and which projects from the inner or aft face of the shroud-side endwall 228 in an axial direction toward the hub-side endwall 226. More specifically, the diffuser vanes 230 may extend to the hub-side endwall 226, with the spacing between the endwalls 226, 228 defining the span of the diffuser vanes 230. The diffuser vanes 230 may be integrally formed with either, both, or neither of the endwalls 226, 228, depending upon the particular manufacturing technique utilized to produce the diffuser 212. In one manufacturing approach, the shroud-side endwall 228 and the diffuser vanes 230 are produced as a single or monolithic piece, for example, by casting or utilizing removing material from a blank utilizing appropriate machining techniques. The hub-side endwall 226 may be separately fabricated in this case, and then brazed or otherwise bonded to the diffuser vanes 230 opposite the shroud-side endwall 228 to yield the diffuser 212. Such a construction can also be inverted such that the hub-side endwall 226 and the diffuser vanes 230 are integrally formed as a single piece, with the shroud-side endwall 228 separately-fabricated and then bonded (or otherwise affixed) in its desired position. In other instances, the diffuser 212 may be produced as a single piece utilizing a casting or additive manufacturing process. Various other manufacturing approaches are also possible and within the scope of the present disclosure.

Figure 5:
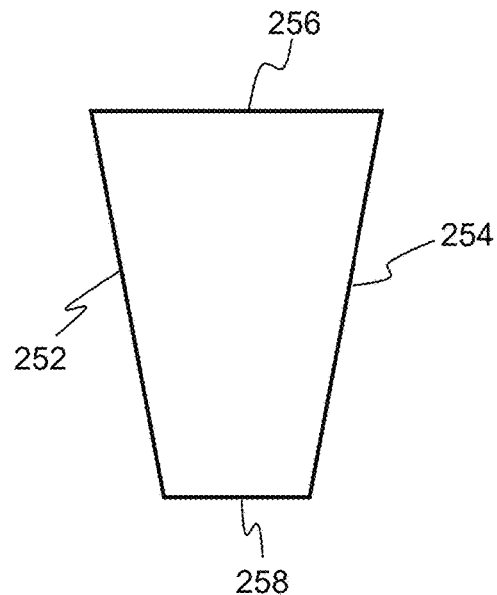
FIG. 5 is a partial view of a diffuser vane of the diffuser of FIG. 4 having a tapered cross-sectional profile portion according to aspects of an exemplary embodiment.

Some or all of the diffuser vanes 230 may include a tapered cross-sectional profile portion, for example, downstream of throats 248 of the diffuser passages 236. For example, FIG. 5 represents a cross-section of an exemplary diffuser vane 230 that includes a first vane sidewall 252, a second vane sidewall 254 opposite the first vane sidewall 252, a shroud-side vane endwall 256, and a hub-side vane endwall 258 opposite the shroud-side vane endwall 256. The shroud-side vane endwall 256 is configured to be secured to or integral with the shroud-side endwall 228 of the diffuser 212, and the hub-side vane endwall 258 is configured to be secured to or integral with the hub-side endwall 226 of the diffuser 212. Alternatively, the shroud-side vane endwall 256 may be secured to or integral with the shroud-side endwall 228 of the diffuser, and the hub-side vane endwall 258 may be in close proximity to the hub-side endwall 226 of the diffuser 212 (or vice versa). As shown in FIG. 5, the diffuser vane 230 includes a tapered cross-section wherein a thickness of the diffuser vane 230 decreases from the shroud-side vane endwall 256 to the hub-side vane endwall 258. The difference in thickness between the shroud-side vane endwall 256 to the hub-side vane endwall 258 may vary depending on the desired flow profile. In some examples, the tapered cross-sectional profile portion includes a first thickness at a trailing edge of the shroud-side vane endwall 256 and a second thickness at the trailing edge of the hub-side vane endwall 258, wherein the first thickness is about 15 to about 50 percent greater than the second thickness. In some nonlimiting examples, the first thickness may be about 0.15 to about 0.30 inches (about 3.81 to about 7.62 mm), and the second thickness may be about 0.10 to about 0.2 inches (about 2.54 to about 5.08 mm).

In this example, the first vane sidewall 252 and the second vane sidewall 254 are both substantially planar, each having linear tapered profiles. The first vane sidewall 252 and the second vane sidewall 254 may be symmetrically tapered, asymmetrically tapered, or variably tapered. It should be noted that the first vane sidewall 252 and the second vane sidewall 254 may be secured to the hub-side endwall 226 and/or shroud-side endwall 228 with nonlinear features such as, for example, a braze or weld material. Such nonlinear features are not considered part of the linear and/or planar portions of the first vane sidewall 252 and the second vane sidewall 254 for the purposes of this description.

The tapered cross-sectional profile portion of the diffuser vanes 230 may extend a portion of a radial length of the diffuser vanes 230. In some examples (including the example of FIG. 4), the tapered cross-sectional profile portion extends from transition locations disposed at or after the throats 248 of the diffuser passages 236 in a flow direction to trailing edges of the diffuser vanes 230. As used herein, the throats 248 of the diffuser passages 236 are disposed at a point of minimum distance between two immediately neighboring of the diffuser vanes 230. In FIG. 4, the tapered cross-sectional profile portion is identified by reference numeral 260 which extends from a transition location at the throat 248 to the trailing edge of the diffuser vane 230. In various examples, the tapered cross-sectional profile portion may extend from a transition location aft or downstream of the throat 248 to the trailing edge of the diffuser vane 230. The change in thickness of the diffuser vanes 230 may increase from the transition location to the trailing edges thereof.

Providing the tapered cross-sectional profile portion on the diffuser vanes 230 promote efficiency in the diffuser 212 and the compressor section 120 overall. For example, the tapered cross-sectional profile portion may reduce diffusion losses in the diffuser 212, the bend 216, and/or the deswirl section 214. In some examples, the compressor section 120 may have increased pressure ratios with little to no impact on the performance of the impeller 210. The tapered cross-sectional profile portion may be particularly beneficial to compressor sections that include the bend 216 prior to the deswirl section 214, wherein the bend 216 includes a flow-path having a bend of about 60 to 150 degrees.

FIGS. 6-9 represent data obtained during experimental investigations leading to aspects of the systems and methods discussed herein. In particular, diffusers were observed during operation of a gas turbine engine. Each of the diffusers included different diffuser vanes. In particular, a baseline diffuser 310 included diffuser vanes that did not include tapered cross-sectional profile portions as discussed herein, and first, second, and third sample diffusers 312, 314, 316 each included diffuser vanes with tapered cross-sectional profile portions of different thicknesses. In general, the compressor section of the gas turbine engine was the same as the compressor section of FIG. 2, that is, the compressor section included an impeller, one of the sample diffusers downstream of the impeller, a bend downstream of the diffuser, and a deswirl section downstream of the bend. In FIGS. 6-9, the diffusion loss is represented on the x-axis (unitless) relative to varying pressure on the y-axis (pounds per second).

Figure 6:
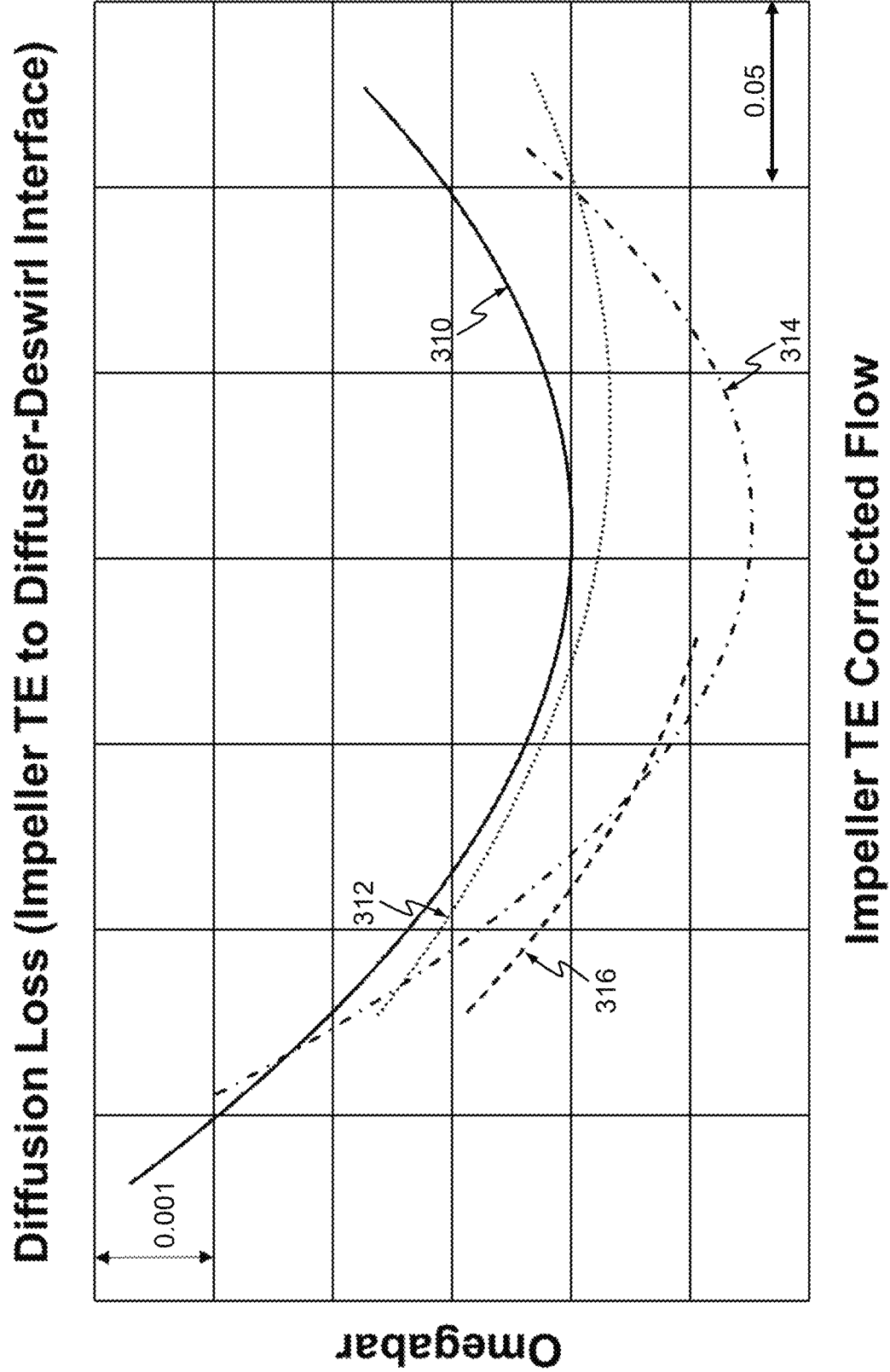
FIGS. 6-9 include graphs representing diffusion loss within an exemplary compressor section of a gas turbine engine according to aspects of an exemplary embodiment. The investigations included diffusers with various types of diffuser vanes.
Figure 7:
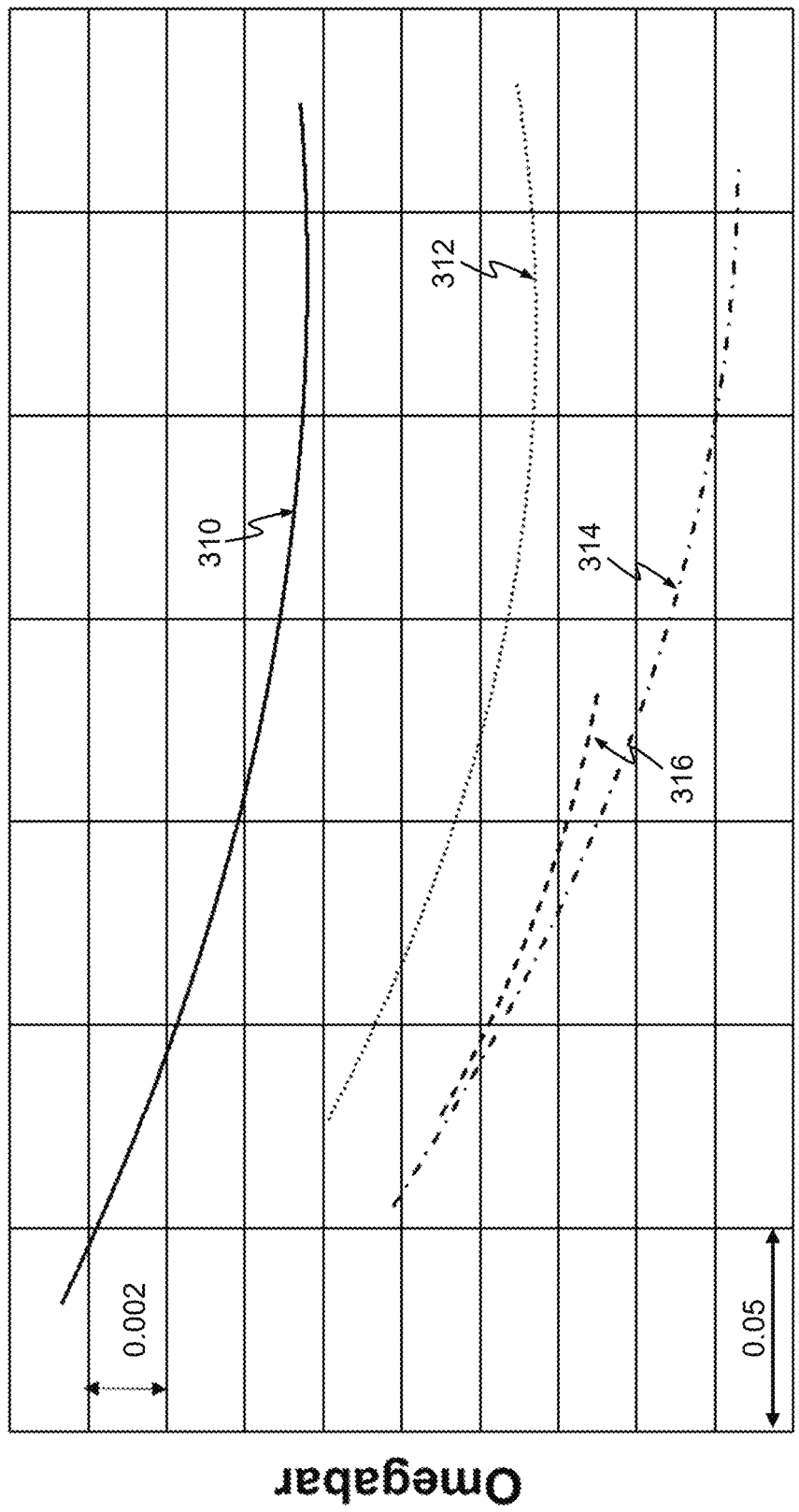
Figure 8:
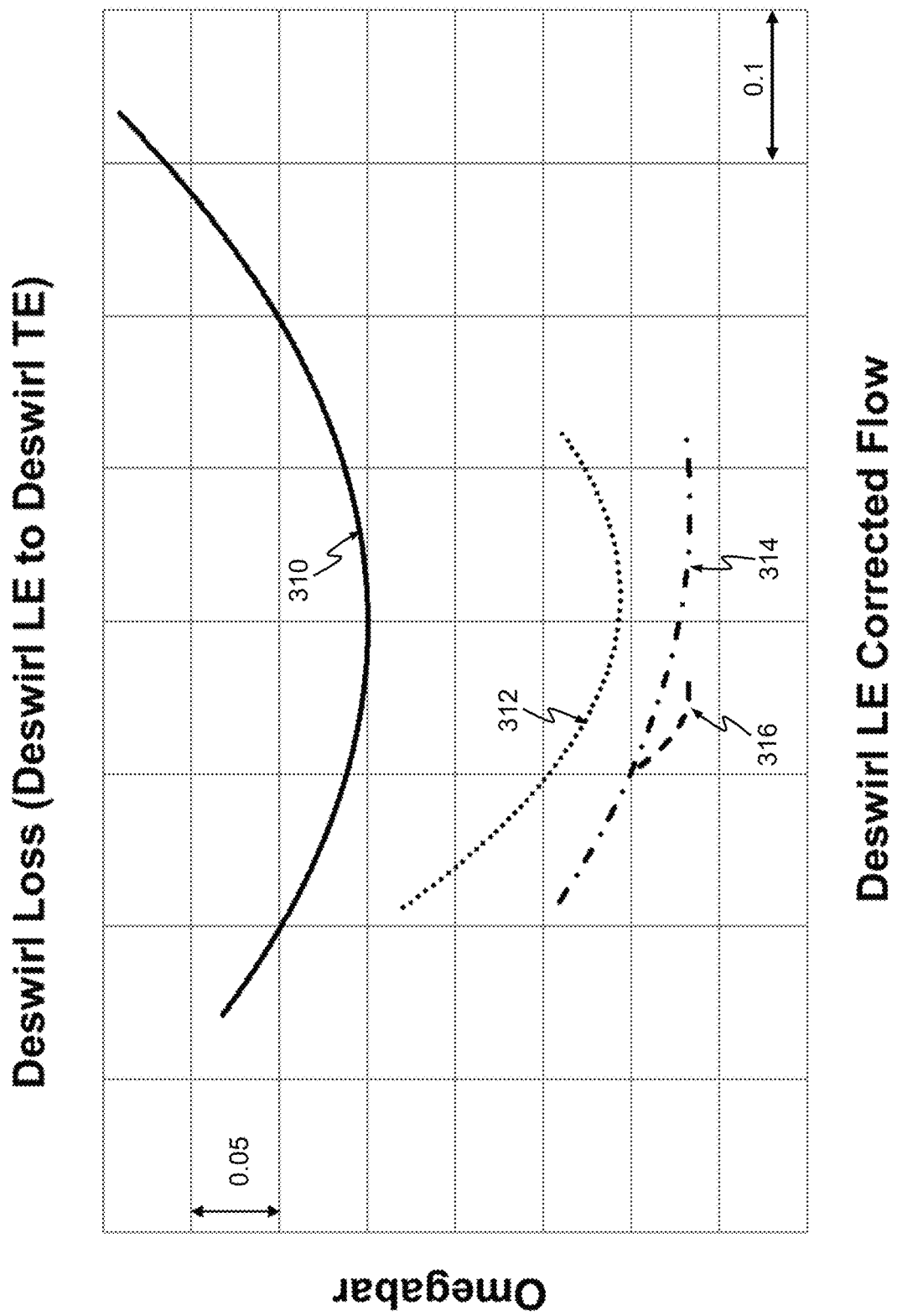
Figure 9:
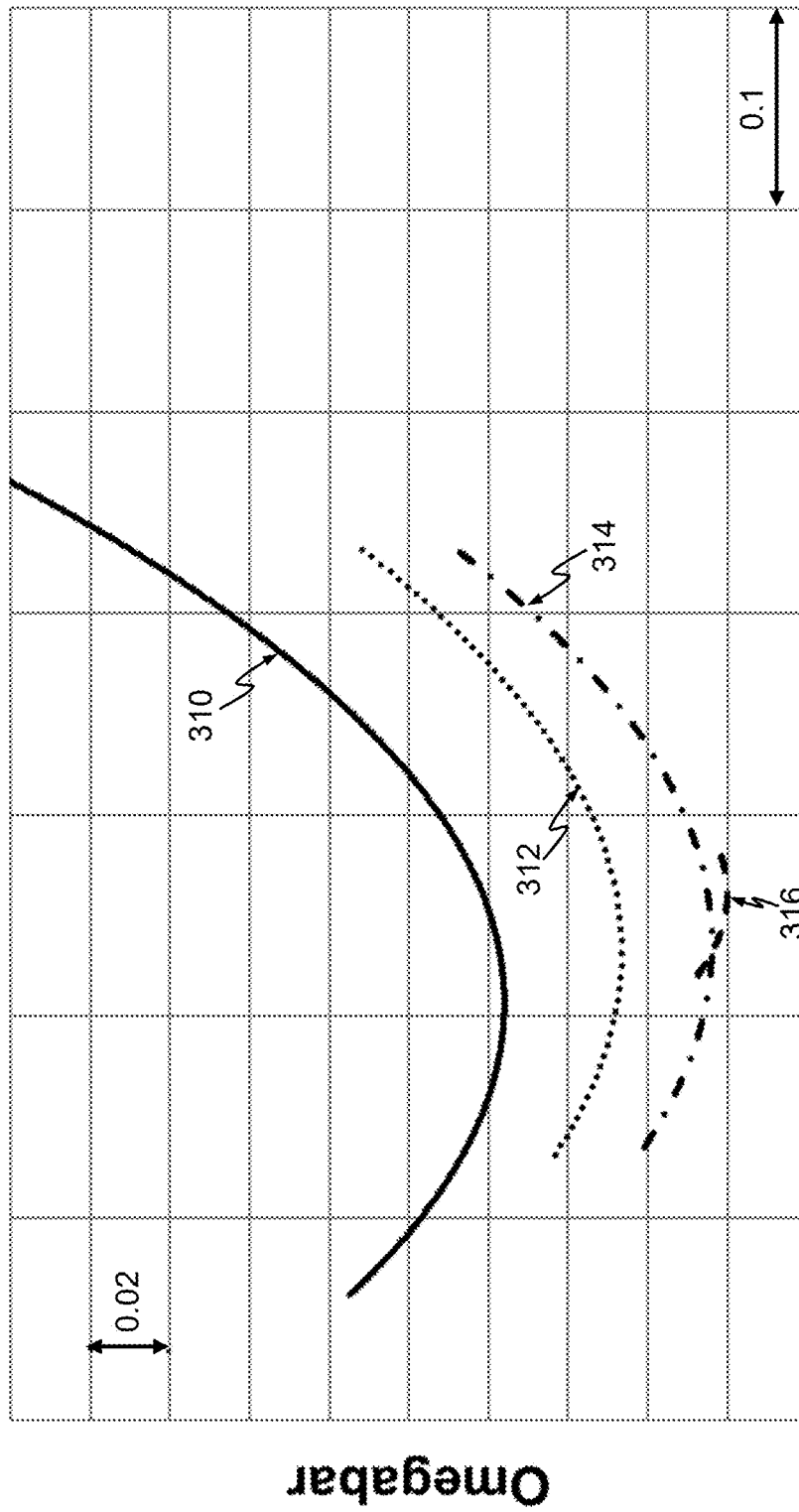

FIG. 6 represents diffusion loss from a trailing edge of the impeller to an interface between the diffuser and the bend, which is substantially representative of diffusion loss reduction for each of the diffusers. FIG. 7 represents diffusion loss from the interface between the diffuser and the bend to the leading edge of the deswirl section, which is substantially representative of diffusion loss reduction for the bend downstream of each of the diffusers. FIG. 8 represents diffusion loss from the leading edge of the deswirl section to a trailing edge of the deswirl section, which is representative of diffusion loss reduction for the deswirl system for each of the diffusers. FIG. 9 represents total diffusion loss from the trailing edge of the impeller to the trailing edge of the deswirl section, which is representative for diffusion loss for the combination of each of the diffusers, the bend, and the deswirl section. As represented, the experimental investigations indicated a reduction in diffusion loss, and therefore an improvement to efficiency, in each of the sections of the compressor section (i.e., the diffuser, the bend, and the deswirl section) for all of the sample diffusers relative to the baseline diffuser. As used herein, the term "diffusion loss" refers to a loss in total pressure through a region of interest, such as the diffusion system including the diffuser, bend, and deswirl. This loss in total pressure may be quantified by the term omegabar which is defined by equation 1.

$$\overline{\omega} = \frac{Pt_{inlet} - Pt_{outlet}}{Pt_{inlet} - Ps_{inlet}} \quad \text{Eq. 1}$$

where $Pt_{inlet}$ is total pressure at an inlet, $Pt_{outlet}$ is a total pressure at an outlet, and $Ps_{inlet}$ is a static pressure at the inlet. As a specific example, the loss in total pressure for the diffusion system from the trailing edge of the impeller to the trailing edge of the deswirl section is defined by equation 2.

$$\overline{\omega} = \frac{Pt_{impeller\_exit} - Pt_{deswirl\_exit}}{Pt_{impeller\_exit} - Ps_{impeller\_exit}} \quad \text{Eq. 2}$$

where $Pt_{impeller\_exit}$ is total pressure at the trailing edge of the impeller (i.e., the inlet of the portion of interest), $Pt_{deswirl\_exit}$ is a total pressure at the trailing edge of the deswirl section (i.e., the outlet of the portion of interest), and $Ps_{impeller\_exit}$ is the static pressure at the trailing edge of the impeller.

Figure 10:
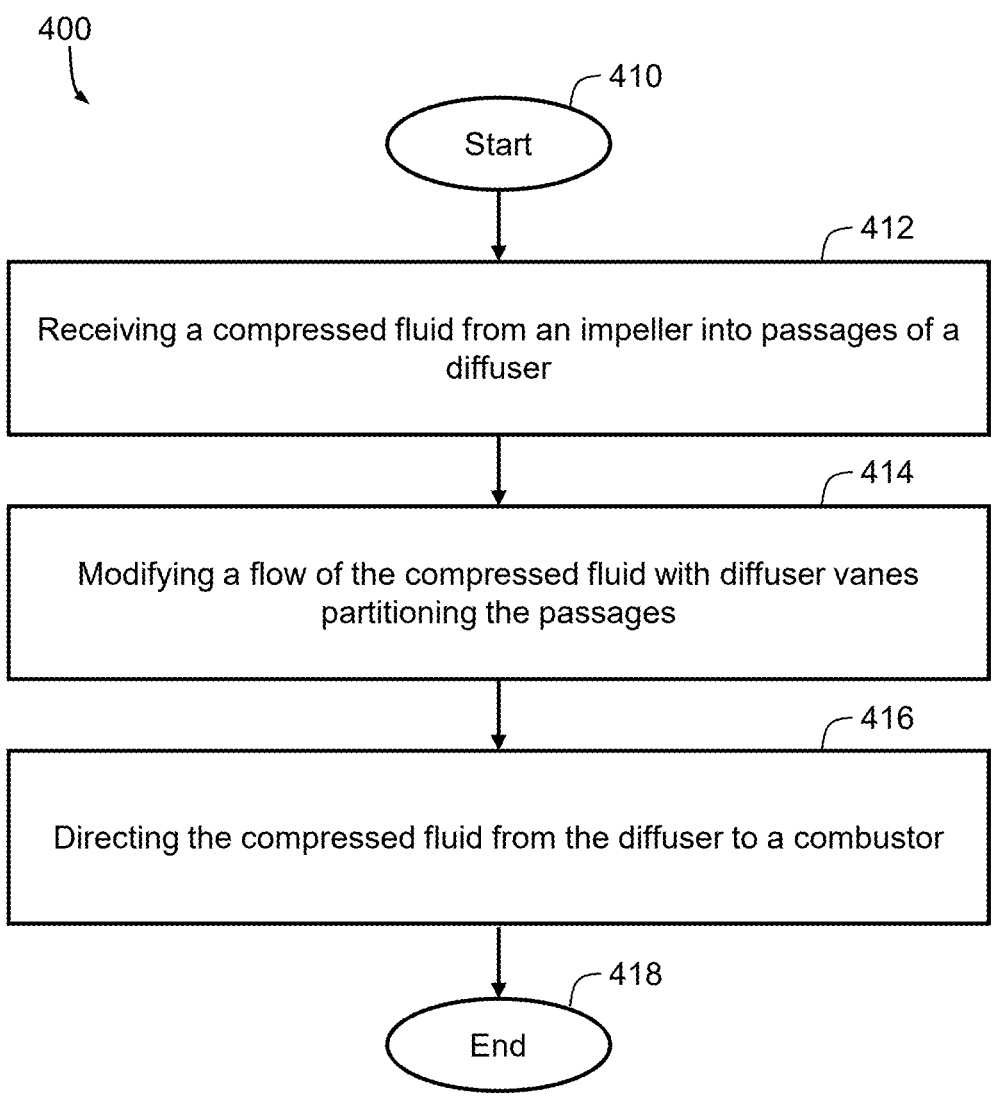
FIG. 10 is a flowchart illustrating an exemplary method for operating a gas turbine engine in accordance with an embodiment.

The diffusers disclosed herein, including the diffuser 212, provide for methods of operating an engine with reduced diffusion loss in the compressor section thereof. For example, FIG. 10 is a flowchart illustrating an exemplary method 400. The method 400 may start at 410. At 412, the method 400 may include receiving a compressed fluid from an impeller into passages of a diffuser. At 414, the method 400 may include modifying a flow of the compressed fluid with diffuser vanes partitioning the passages. The diffuser vanes each include a first vane sidewall, a second vane sidewall opposite the first vane sidewall, a hub-side endwall, and a shroud-side endwall opposite the hub-side endwall. Each of the diffuser vanes have a thickness between the first sidewall and the second sidewall and a tapered cross-sectional profile portion, wherein the thickness of each of the diffuser vanes within the tapered cross-sectional profile portion decreases from the shroud-side endwall to the hub-side endwall. At 416, the method 400 may include directing the compressed fluid from the diffuser to a combustor. The method 400 may end at 418.

In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language. The sequence of the text in any of the claims does not imply that process steps must be performed in a temporal or logical order according to such sequence unless it is specifically defined by the language of the claim. The process steps may be interchanged in any order without departing from the scope of the invention as long as such an interchange does not contradict the claim language and is not logically nonsensical.

Furthermore, depending on the context, words such as "connect" or "coupled to" used in describing a relationship between different elements do not imply that a direct physical connection must be made between these elements. For example, two elements may be connected to each other physically, electronically, logically, or in any other manner, through one or more additional elements.

As used herein, the term "axial" refers to a direction that is generally parallel to or coincident with an axis of rotation, axis of symmetry, or centerline of a component or components. For example, in a cylinder or disc with a centerline and generally circular ends or opposing faces, the "axial" direction may refer to the direction that generally extends in parallel to the centerline between the opposite ends or faces. In certain instances, the term "axial" may be utilized with respect to components that are not cylindrical (or otherwise radially symmetric). For example, the "axial" direction for a rectangular housing containing a rotating shaft may be viewed as a direction that is generally parallel to or coincident with the rotational axis of the shaft. Furthermore, the term "radially" as used herein may refer to a direction or a relationship of components with respect to a line extending outward from a shared centerline, axis, or similar reference, for example in a plane of a cylinder or disc that is perpendicular to the centerline or axis. In certain instances, components may be viewed as "radially" aligned even though one or both of the components may not be cylindrical (or otherwise radially symmetric). Furthermore, the terms "axial" and "radial" (and any derivatives) may encompass directional relationships that are other than precisely aligned with (e.g., oblique to) the true axial and radial dimensions, provided the relationship is predominantly in the respective nominal axial or radial direction. As used herein, the term "substantially" denotes within 5% to account for manufacturing tolerances. Also, as used herein, the term "about" denotes within 5% to account for manufacturing tolerances.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A diffuser configured to be disposed in an engine downstream of an impeller of a centrifugal compressor, comprising:
   a diffuser flowbody having an inner peripheral portion and an outer peripheral portion;
   diffuser passages extending through the diffuser flowbody, the diffuser passages comprising:
      passage inlets formed in the inner peripheral portion of the diffuser flowbody; and
      passage outlets formed in the outer peripheral portion of the diffuser flowbody; and
   diffuser vanes contained in the diffuser flowbody and partitioning the diffuser passages, each of the diffuser vanes comprising a first vane sidewall, a second vane sidewall opposite the first vane sidewall, a hub-side endwall, and a shroud-side endwall opposite the hub-side endwall, wherein each of the diffuser vanes having a thickness between the first vane sidewall and the second vane sidewall and a tapered cross-sectional profile portion, wherein the thickness of each of the diffuser vanes within the tapered cross-sectional profile portion decreases from the shroud-side endwall to the hub-side endwall.

2. The diffuser of claim 1, wherein the first vane sidewall and the second vane sidewall are symmetrically tapered in the tapered cross-sectional profile portion of the diffuser vanes.

3. The diffuser of claim 1, wherein the first vane sidewall and the second vane sidewall are asymmetrically tapered in the tapered cross-sectional profile portion of the diffuser vanes.

4. The diffuser of claim 1, wherein the first vane sidewall and the second vane sidewall are variably tapered in the tapered cross-sectional profile portion of the diffuser vanes.

5. The diffuser of claim 1, wherein the first vane sidewall and the second vane sidewall are both planar and have a linear taper in the tapered cross-sectional profile portion of the diffuser vanes.

6. The diffuser of claim 1, wherein the passage inlets are configured to receive a fluid flow from the impeller and the passage outlets are configured to provide the fluid flow to a deswirl system via a flowpath having a bend of 60 to 150 degrees.

7. The diffuser of claim 1, wherein the tapered cross-sectional profile portion includes a first thickness at a trailing edge of the shroud-side endwall and a second thickness at a trailing edge of the hub-side endwall, wherein the first thickness is 15 to 50 percent greater than the second thickness.

8. The diffuser of claim 1, wherein each of the diffuser passages include passage throats disposed at a point of minimum distance between two immediately neighboring of the diffuser vanes, wherein the tapered cross-sectional profile portion is disposed at or downstream of the passage throats.

9. The diffuser of claim 8, wherein the tapered cross-sectional profile portion of each of the diffuser vanes extends from a transition location of each of the diffuser vanes at the passage throats to trailing edges of the diffuser vanes.

10. A gas turbine engine, comprising:
    a compressor section including:
       an impeller configured to pressurize an intake fluid to produce a compressed fluid; and
       a diffuser configured to receive the compressed fluid in passages thereof, wherein the passages are partitioned by diffuser vanes each including a first vane sidewall, a second vane sidewall opposite the first vane sidewall, a hub-side endwall, and a shroud-side endwall opposite the hub-side endwall, wherein each of the diffuser vanes have a thickness between the first vane sidewall and the second vane sidewall and a tapered cross-sectional profile portion, wherein the thickness of each of the diffuser vanes within the tapered cross-sectional profile portion decreases from the shroud-side endwall to the hub-side endwall;
    a combustion section configured to form a mixture of the compressed fluid with a fuel and combust the mixture to form an exhaust; and
    a turbine section configured to rotate in response to receiving the exhaust.

11. The gas turbine engine of claim 10, wherein the tapered cross-sectional profile portion of the diffuser vanes includes a first thickness at a trailing edge of the shroud-side endwall and a second thickness at a trailing edge of the hub-side endwall, wherein the first thickness is 15 to 50 percent greater than the second thickness.

12. The gas turbine engine of claim 10, wherein each of the passages include passage throats disposed at a point of minimum distance between two immediately neighboring of the diffuser vanes, wherein the tapered cross-sectional profile portion is disposed downstream of the passage throats.

13. The gas turbine engine of claim 12, wherein the tapered cross-sectional profile portion of each of the diffuser vanes extends from transition locations of the diffuser vanes at the passage throats to trailing edges of the diffuser vanes.

14. The gas turbine engine of claim 10, further comprising a deswirl system configured to receive the compressed fluid from the diffuser and direct the compressed fluid to the combustion section.

15. A method of operating an engine, comprising:
    receiving a compressed fluid from an impeller into passages of a diffuser;
    modifying a flow of the compressed fluid with diffuser vanes partitioning the passages, wherein the diffuser vanes each include a first vane sidewall, a second vane sidewall opposite the first vane sidewall, a hub-side endwall, and a shroud-side endwall opposite the hub-side endwall, wherein each of the diffuser vanes having a thickness between the first vane sidewall and the second vane sidewall and a tapered cross-sectional profile portion, wherein the thickness of each of the diffuser vanes within the tapered cross-sectional profile portion decreases from the shroud-side endwall to the hub-side endwall; and directing the compressed fluid from the diffuser to a combustor.

16. The method of claim 15, wherein directing the compressed fluid to the combustor includes directing the compressed fluid from the diffuser through flowpath having a bend of 60 to 90 degrees.

17. The method of claim 15, wherein directing the compressed fluid to the combustor includes directing the compressed fluid through a deswirl system upstream of the combustor.

18. The method of claim 15, wherein the tapered cross-sectional profile portion of the diffuser vanes includes a first thickness at a trailing edge of the shroud-side endwall and a second thickness at a trailing edge of the hub-side endwall, wherein the first thickness is 15 to 50 percent greater than the second thickness.

19. The method of claim 15, wherein each of the passages include passage throats disposed at a point of minimum distance between two immediately neighboring of the diffuser vanes, wherein the tapered cross-sectional profile portion is disposed downstream of the passage throats.

20. The method of claim 19, wherein the tapered cross-sectional profile portion of each of the diffuser vanes extends from transition locations of the diffuser vanes at the passage throats to trailing edges of the diffuser vanes.

* * * * *